United States Patent [19]

Bingo et al.

[11] 4,156,139
[45] May 22, 1979

[54] METHOD FOR DIRECT MEASUREMENT OF ABSORBED DOSE RATE OF BETA-RAYS AND AN INSTRUMENT THEREFOR

[75] Inventors: Kazuyoshi Bingo; Toru Chida, both of Tokai, Japan

[73] Assignee: Japan Atomic Energy Research Institute, Tokyo, Japan

[21] Appl. No.: 795,637

[22] Filed: May 10, 1977

[30] Foreign Application Priority Data

May 21, 1976 [JP] Japan .................... 51/58846

[51] Int. Cl.² .................... G01N 23/00; G01T 1/20
[52] U.S. Cl. ................... 250/308; 250/362; 250/369
[58] Field of Search ............... 250/308, 361, 362, 363, 250/369, 510

[56] References Cited

U.S. PATENT DOCUMENTS

| | | | |
|---|---|---|---|
| 3,646,347 | 2/1972 | Farmer et al. | 250/369 |
| 3,892,971 | 7/1975 | Arthur et al. | 250/510 |

FOREIGN PATENT DOCUMENTS 724283  12/1965  Canada .................... 250/369

Primary Examiner—Alfred E. Smith
Assistant Examiner—Janice A. Howell
Attorney, Agent, or Firm—Browdy and Neimark

[57] ABSTRACT

A method and an instrument are, herein, disclosed for measuring the absorbed dose rate of beta-rays in sites of the human body. The instrument of this invention consists of a filter, a thin scintillator, a photomultiplier tube, a linear amplifier, a discriminator having a plurality of pulse height selection potentiometers for selectively taking in only pulses of pulse heights above specified upper limit of pulse height discrimination, a shaper for shaping the selected pulses, and a dose rate indicator for counting the shaped pulses.

The method and the apparatus of this invention are characterized by making the relationship between the counting rate per fluence rate and the maximum energy of beta-ray equal to the relationship between the absorbed dose rate per fluence rate and the maximum energy of beta-ray, and therefore, the absorbed dose rate can be measured independent of the energy of beta-ray.

4 Claims, 5 Drawing Figures

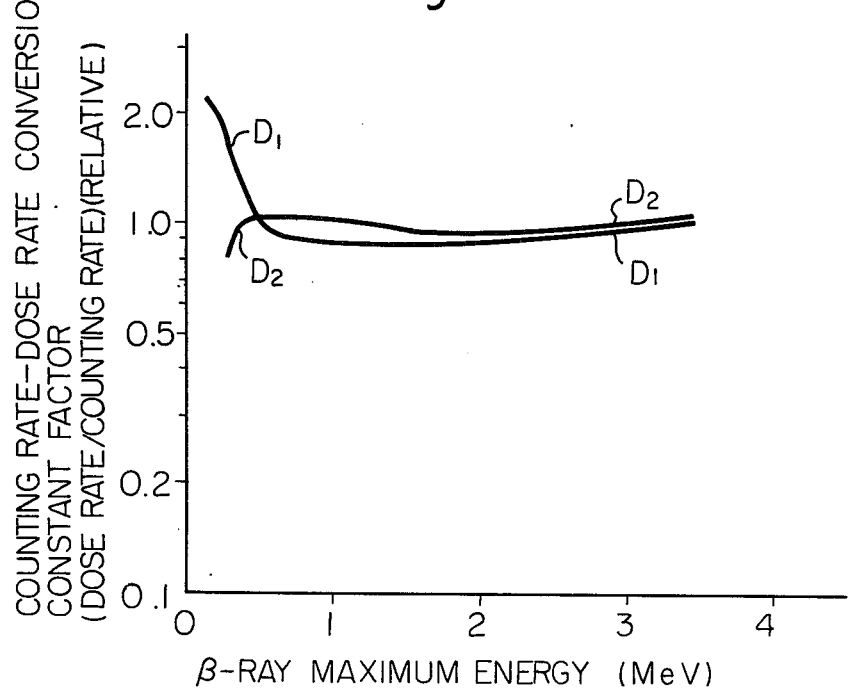

METHOD FOR DIRECT MEASUREMENT OF ABSORBED DOSE RATE OF BETA-RAYS AND AN INSTRUMENT THEREFOR

DETAILED DESCRIPTION OF THE INVENTION

This invention relates to a simple method for measuring an absorbed dose rate of beta-ray and an instrument therefor. To be more specific, this invention relates to a method for readily determining the absorbed dose rate of beta-rays absorbed by the human body in a radiation field where there is a danger of the human body being exposed to beta-rays, and to an instrument for direct measurement of said dose rate.

To measure dose rate in a radiation field for the purpose of protecting the human body against radiation, ionization chamber and GM survey meter are employed for gamma-ray, and REM counter for neutrons. But no such handy dosimeter exists for measuring absorbed dose rate of beta-rays. A major reason for the difficulty in measurement of beta-ray absorbed dose rate is that, first, beta-rays have a greater absorption coefficient than other radiations, and that therefore, the absorbed dose varies not only depending upon the energy of incident beta-rays but also upon the epidermal thickness of human tissue (or depth in terms of mg/cm$^2$) to be measured.

In this connection, reference should be made to FIG. 1 which shows the relationship between absorbed dose rate of beta-rays per fluence rate (in terms of (rad/hr)/(n/cm$^2$.sec) and the maximum beta-ray energy. In the figure, curve A indicates the absorbed dose rate of beta-rays per fluence rate delivered in a skin whose epidermal thickness is 7 mg/cm$^2$, whereas curve B indicates such dose rate in the finger tip where the thickness is 40 mg/cm$^2$. As stated above, the absorbed dose of beta-rays varies depending upon the epidermal thickness of human tissue (or depth in terms of mg/cm$^2$) to be measured, even if the same quantity in fluence rate and beta-ray energy is incident. Therefore, it has been very difficult to measure accurately the absorbed dose rate of beta-rays only by fluence of beta-rays.

Accordingly, the advent of a handy method for measurement of the absorbed dose rate of beta-rays and a direct measuring instrument therefor has long been desired in the field of radiation protection.

Therefore, one of the main objects of this invention is to provide a method for readily measuring the absorbed dose rate of beta-rays.

Another object of this invention is to provide a portable instrument for directly measuring the absorbed dose rate of beta-rays.

Other objects and advantages of this invention will become apparent as the pages develop in the following.

A preferred embodiment of the invention is further described which makes reference to the accompanying drawings in which;

FIG. 5 is a graph showing the dose rate conversion coefficient (dose rate/counting rate) and maximum energy of beta-rays.

Figure 2:
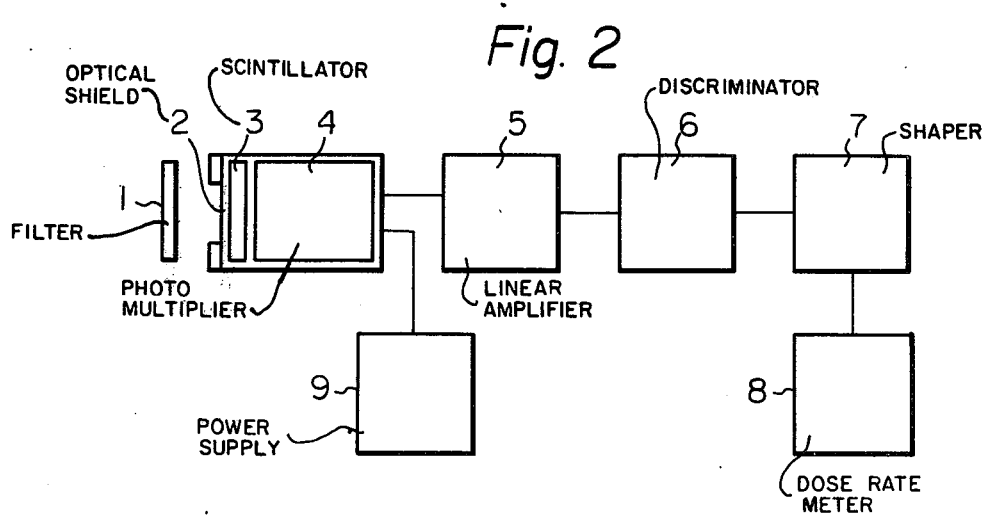
FIG. 2 is a block diagram of $\beta$-ray absorbed dose rate meter of the invention of this invention.

Referring to FIG. 2, the beta-ray absorbed dose rate meter of this invention is provided with a filter 1 for limiting the quantity of incident beta-rays. The filter is used particularly to correct the side of high-energy of beta-rays and is preferably made of materials of low atomic number. Beta-rays passing through the filter 1 and an optical shield 2 fall upon a scintillator 3 to be converted to light, and thereafter are multiplied by a photomultiplier tube 4 to be outputted as pulse. The pulses are amplified by a linear amplifier 5 and pulses of a specified pulse height are selected by a discriminator 6, the discrimination level of which is set by a potentiometer, according to the epidermal thickness of the tissue measured, and then the selected pulses are shaped by a shaper 7 and counted by a dose rate indicator (rate meter) 8. The instrument is also provided with a high voltage power supply 9.

Figure 3:
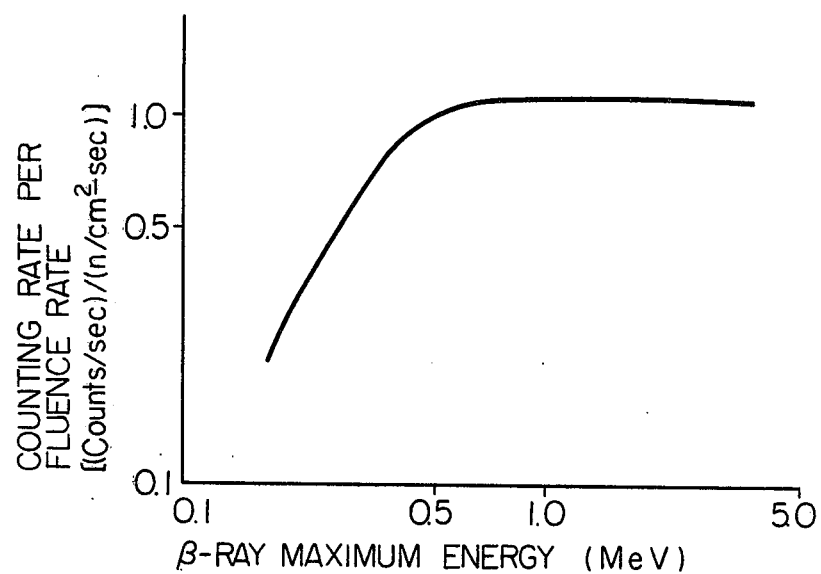
FIG. 3 is a graph showing the relationship between the counting rate of beta-rays per fluence rate (unit: (counts/sec) (n/cm$^2$. sec)) and the maximum energy of beta-rays by means of $\beta$-ray absorbed dose rate meter of this invention.

FIG. 3 shows the relationship between counting rate of beta-rays per fluence rate and the maximum energy of beta-rays in the case when no filter is used in the instrument of this invention (it may be regarded that 0 mg/cm$^2$ of filter is used). It is able to measure the absorbed dose rate of beta-rays without information about other factors such as the energy of beta-rays by correcting the correlation between the counting rate of beta-rays per fluence rate (unit: (counts/sec)/(n/cm$^2$.sec)) and the maximum energy of beta-rays to be equal to the one indicated by curve A (or B) in FIG. 1. This is the most important aspect of this invention. That is to say, if a proportional relationship between dose rate of beta-rays per fluence rate and counting rate of beta-rays per fluence rate can be obtained over a wide range of beta-ray energy, the absorbed dose rate is obtained by multiplying the counting rate by the constant factor (counting rate-dose rate conversion constant factor).

Figure 1:
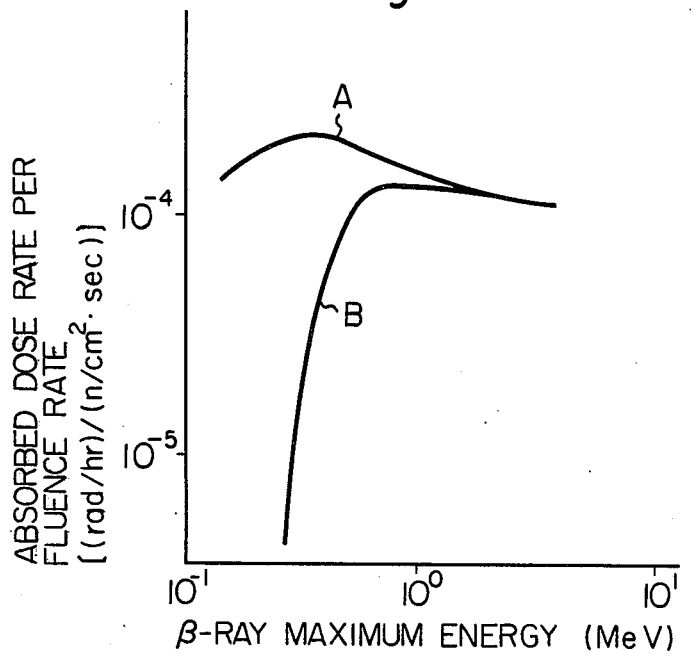
FIG. 1 is a graph showing the relationship between absorbed dose rate of beta-rays per fluence rate and the maximum energy of beta-rays.
Figure 4:
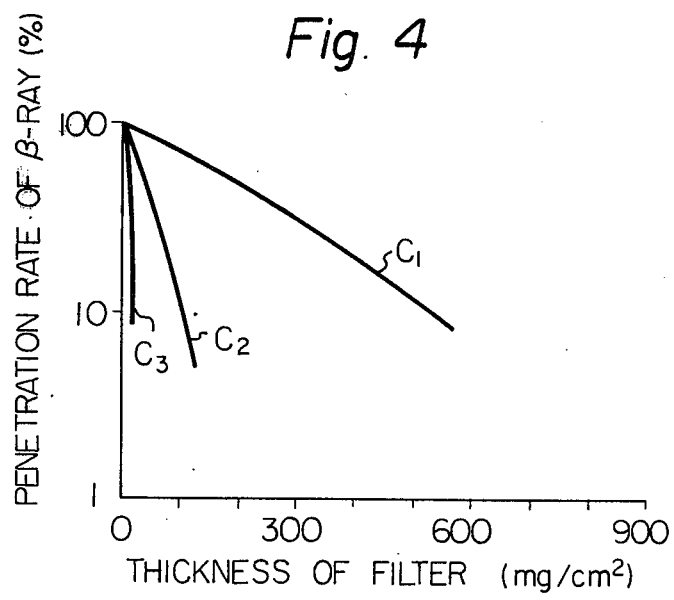
FIG. 4 is a graph showing the relationship between the penetration rate of beta-rays and the thickness of the filter.

In the instrument of this invention, the correction of the correlation between the counting rate of beta-rays per fluence rate and the maximum energy of beta-rays to be equal to the one indicated by curve A (or B) in FIG. 1 is carried out by the combination of two methods. One is the method using the difference in counting rates obtained by employing two kinds of filters of different shape and thickness to correct the side of high energy of beta-rays. FIG. 4 is a graph showing the relationship between the penetration rate (%) of beta-rays and the thickness of the filter and curves $C_1$, $C_2$ and $C_3$ represent, respectively, the penetration rate of $^{90}$Y (maximum energy of 2.27 MeV) beta-rays, $^{204}$Tl (0.766 MeV) beta-rays and $^{45}$Ca (0.255 MeV) beta-rays. When a 100 mg/cm$^2$ of filter is used, the penetration rate of beta-rays is 68% for $^{90}$Y, 13% for $^{204}$Tl and 0% for $^{45}$Ca. On the other hand, the counting rate, obtained by the subtraction of the counting rate measured with the 100 mg/cm$^2$ filter from the counting rate measured without filter (that is, 0 mg/cm$^2$ filter is used), is 32% for $^{90}$Y, 87% for $^{204}$Tl and 100% for $^{45}$Ca. This correction is effective for high energy $\beta$-rays.

The other method is characterized by correcting the side of low energy of beta-rays by means of a discriminator. When the pulse height discrimination level is raised, most all of the pulses of $^{45}$Ca of which energy is lowest in three types disclosed in FIG. 4 is not shaped.

Accordingly, the counting rates of low energy beta-rays such as $^{45}$Ca become low by this correction.

The invention is further illustrated but not limited as to its scope by the following examples.

EXAMPLE 1

This example was carried out to measure the absorbed dose rate of beta-rays in a body whose skin has an epidermal thickness is 7 mg/cm$^2$.

The experimental conditions are itemized below:
(1) fixed level of discriminator: 0.3 V
(2) combination of filters:
   (a) 0 mg/cm$^2$
   (b) right-hand side of incidence plane: 10 mg/cm$^2$
       left-hand side of incidence plane: 500 mg/cm$^2$
(3) evaluation method:
   {[counting rate in (a)] - [counting rate in (b)]} x counting rate - dose rate conversion constant factor = absorbed dose rate.

The counting rate-dose rate conversion constant is shown by Curve $D_1$ of FIG. 5. The errors in evaluation in this example 1 were less than ± 15% covering a wide energy range of from 0.4 to 4 Mev.

EXAMPLE 2

This example was carried out to measure the absorbed dose rate of beta-rays in a finger tip whose epidermal thickness is 40 mg/cm$^2$.
(1) fixed level of discriminator: 1.5 V
(2) combination of filters:
   (a) 0 mg/cm$^2$
   (b) right-hand side of incidence plane: 25 mg/cm$^2$
       left-hand side of incidence plane: 700 mg/cm$^2$
(3) evaluation method:
   {[counting rate in (a)] - [counting rate in (b)]} x counting rate-dose rate conversion constant = absorbed dose rate.

The counting rate-dose rate conversion constant is shown by Curve $D_2$ of FIG. 5. The errors in evaluation in this example 2 were less than ± 10% covering a wide energy range of from 0.25 to 4 MeV.

Even if the instrument of this invention is used in the mixed radiation field of beta-rays and gamma-rays, the absorbed dose rate measured by the instrument shows a correct value. As, a penetration rate of gamma-rays is very small and the counting rate of this instrument is obtained by subtracting a counting rate measured with the filter such as shown in the examples from a counting rate without filter, a counting rate caused by gamma-rays are also subtracted.

It is preferred that the structure of the instrument of this invention have a plurality of filters having different shape and different thickness included therein and that the discriminator employed in the instrument of this invention has plural potentiometers in parallel for setting discrimination levels; the various potentiometers can be actuated by an external rotary switch, according to the epidermal thickness of tissue.

What is claimed is:

1. A method of measuring the beta-ray absorbed dose rate corresponding to the epidermal thickness of tissue independently of beta-ray energies by a beta-ray detector having a filter, a plastic scintillator, a photomultiplier tube, a linear amplifier, and a discriminator, said method comprising the steps of:

filtering beta-rays incident upon the scintillator during a particular time interval to obtain filtered beta-rays, and removing the filter so as to provide an unobstructed path to beta-rays incident upon a scintillator during a different time interval to obtain unfiltered beta-rays;

converting the filtered and unfiltered beta-rays incident upon the scintillator to electrical pulses to obtain, respectively, filtered and unfiltered pulses;

selecting by means of said discriminator only those electrical pulses above a preselected pulse height;

counting respectively the number of filtered and unfiltered pulses;

subtracting the number of filtered pulses from the number of unfiltered pulses to obtain a remainder; and multiplying said remainder by a constant factor, said constant factor being a constant of proportionality between the counting rate per fluence and the dose rate per fluence.

2. An instrument for directly measuring beta-ray absorbed dose rate comprising:

a scintillator for converting the beta-rays to light;

a filter, removably connected to said scintillator, for limiting the number of incident beta-rays on said scintillator;

a photomultiplier for converting the light from said scintillator to a pulse;

a linear amplifier for amplifying the pulse from said photomultiplier;

variable discriminator means for selecting pulses from said linear amplifier of heights above a variable specified lower limit;

shaping means for shaping the pulses of heights above the specified lower limit selected by said discriminator means;

a dose rate indicator means for counting the shaped pulses from said shaping means; and a high voltage power supply for said photomultiplier.

3. An instrument for directly measuring the beta-ray absorbed dose rate, according to claim 2, wherein said filter is made of material of low atomic number.

4. An instrument for directly measuring the beta-ray absorbed dose rate, according to claim 2, wherein said discriminator means has a plurality of pulse height selection potentiometers disposed in parallel, and further including an external rotary switch which actuates the various potentiometers for determining the beta-ray absorbed dose rate for different thicknesses of the epidermal tissue.

* * * * *